(No Model.)

S. W. ENGLISH.
SCREW.

No. 586,232. Patented July 13, 1897.

Witnesses.
E. S. Harrington
C. E. Parker

Inventor.
Samuel W. English
by
Attorney.

United States Patent Office.

SAMUEL W. ENGLISH, OF CLAYTON, NEW JERSEY, ASSIGNOR OF TWO-THIRDS TO GEORGE F. ENGLISH, OF SAME PLACE, AND EDWIN S. HARRINGTON, OF PHILADELPHIA, PENNSYLVANIA.

SCREW.

SPECIFICATION forming part of Letters Patent No. 586,232, dated July 13, 1897.

Application filed October 16, 1896. Serial No. 609,080. (No model.)

*To all whom it may concern:*

Be it known that I, SAMUEL W. ENGLISH, a citizen of the United States, residing at Clayton, in the county of Gloucester, State of New Jersey, have invented certain new and useful Improvements in Screws, of which the following is a full, clear, and exact description, reference being had to the accompanying drawings, forming a part of this specification.

Heretofore great difficulty has been experienced in driving the ordinary screw into hard woods owing to the thread and body of the screw having in their passage to compress the wood laterally. To obviate this defect, I so construct the screw-thread as to provide thereon sharp corners that cut their way in the material into which the screw is driven. I also provide the head of the screw upon the under side with grooves having cutting edges, for the purpose hereinafter described.

Figure 1:
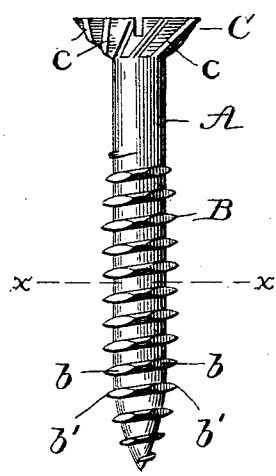
Figure 2:
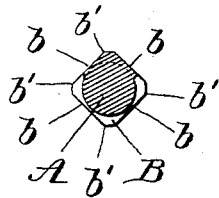

In the drawings, Figure 1 is an elevation of a screw embodying my invention. Fig. 2 is a cross-section as on the line $x\ x$ of Fig. 1.

A represents the body of the screw, B the thread thereof, and C the head. The threaded portion is flattened upon its sides, as indicated at $b$, thereby producing sharp corners $b'$, which when the screw is driven in the usual manner cut away the wood in their line of travel, the chips therefrom occupying the spaces between the circle of the hole thus cut and the flat portions of the screw-thread. The flattened portions $b$ extend the full length of the thread and when upon four sides of the screw, as shown in the drawings, give the screw the general rectangular form shown in Fig. 2.

The neck or shank of the screw above the threaded portion is slightly constricted or of less diameter than the threaded portion with its threads and of substantially the same diameter as the body or core of the threaded portion. The purpose of this constriction is to prevent the screw from binding as it is driven "home."

It will be seen from the drawings that the body of the screw is not itself flattened, but that it is the edge portion of the thread which is taken off, thereby leaving a portion of said thread continuous upon and around said body. In this manner the screw retains practically, or to a large extent, the full effect of the thread in so far as its feeding or drawing action is concerned, so that the screw can be readily seated or unseated by the use of a screw-driver, and also with respect to its holding action, since the surrounding wood will to a considerable extent become engaged with the remaining portions of the thread. It will also be seen that owing to the general rectangular form of the screw shown it can be readily driven to its seat in the manner of a nail. When seated, it can be turned about forty-five degrees to cause the corners $b'$ to engage the wood. Owing to the fact that the flattened sides do not break or bruise the wood to any great extent solid surfaces are provided for the engagement of such corners.

In manufacturing a screw of this description the blanks may first be flattened upon that portion of the shank on which the thread is to be formed and such portion afterward threaded, so that the cost of producing the screw will be increased but little, if at all, over the old mode of production.

I preferably, though not essentially, provide the tapering sides of the screw-head with helically-disposed grooves having cutting edges $c$, which are designed to cut into the surface of the wood and thus countersink said head as it is driven home, the grooves forming guides or ways for the escape of the chips.

I claim as my invention—

1. As a new article of manufacture, the herein-described improved screw, having a circular body portion or core surrounded by a thread whose edge portion is cut away or flattened off upon three or more sides of the screw without destroying the continuity of the thread and forming sharp cutting corners, substantially as described.

2. As a new article of manufacture, the herein-described improved screw, having a circular body portion or core surrounded by a continuous thread which is flattened off to an extent less than its depth upon four equal sides throughout its length without destroying its continuity, and providing sharp cutting corners, substantially as specified.

3. As a new article of manufacture, the herein-described improved screw, having a circular body portion or core surrounded by a continuous thread whose edge is flattened off upon three or more sides of the screw to an extent less than its depth, forming sharp cutting corners or edges, and whose tapered head is provided with grooves upon its under side, substantially as specified.

4. As a new article of manufacture, the herein-described improved screw having a circular body portion or core surrounded by a continuous thread which is flattened off upon three or more sides of the screw throughout its length to a less extent than its depth, whereby sharp cutting corners are provided, and whose neck portion or shank above the thread is of less diameter than the threaded portion with its thread, substantially as described.

In testimony whereof I have hereunto affixed my signature this 8th day of October, A. D. 1896.

SAMUEL W. ENGLISH.

Witnesses:
BENJ. M. TURNER,
H. T. FENTON.